US012784150B2

(12) United States Patent
Park et al.

(10) Patent No.: US 12,784,150 B2
(45) Date of Patent: Nov. 3, 2026

(54) METHOD AND DEVICE FOR EXTRACTING NOISE OF COMPRESSED IMAGE, AND METHOD AND DEVICE FOR REDUCING NOISE OF COMPRESSED IMAGE

(71) Applicant: SAMSUNG ELECTRONICS CO., LTD., Suwon-si (KR)

(72) Inventors: Jaeyeon Park, Suwon-si (KR); Iljun Ahn, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 514 days.

(21) Appl. No.: 17/987,582

(22) Filed: Nov. 15, 2022

(65) Prior Publication Data

US 2023/0075881 A1 Mar. 9, 2023

Related U.S. Application Data

(63) Continuation of application No. PCT/KR2021/006074, filed on May 14, 2021.

(30) Foreign Application Priority Data

May 15, 2020 (KR) ........................ 10-2020-0058331
Nov. 23, 2020 (KR) ........................ 10-2020-0158043

(51) Int. Cl.
*G06T 5/70* (2024.01)
*G06T 3/40* (2006.01)
(Continued)

(52) U.S. Cl.
CPC .................. *G06T 5/70* (2024.01); *G06T 3/40* (2013.01); *G06T 5/20* (2013.01); *G06T 5/50* (2013.01);
(Continued)

(58) Field of Classification Search
None
See application file for complete search history.

(56) References Cited

U.S. PATENT DOCUMENTS 10,057,576 B2 8/2018 Okamoto
10,083,499 B1 9/2018 Milanfar et al.
(Continued)

FOREIGN PATENT DOCUMENTS

CN 110232670 A * 9/2019 ............... G06T 5/00
CN 110310227 A * 10/2019 ........... G06N 3/0454
(Continued)

OTHER PUBLICATIONS

Wang, C., Zhao, Y., & Wang, R. (2019). Deep Inverse Tone Mapping for Compressed Images. IEEE Access, 7, 74558-74569.*
(Continued)

*Primary Examiner* — Andrew W Bee
*Assistant Examiner* — Christine Zhao
(74) *Attorney, Agent, or Firm* — Sughrue Mion, PLLC

(57) ABSTRACT

Provided is a method of reducing noise of a compressed image, the method including obtaining a first image by applying a convolution filter, which sequentially performs down-convolution and up-convolution corresponding to the down-convolution, to a compressed image of an original image, obtaining a second image by subtracting the first image from the compressed image, obtaining noise comprising high-frequency information and a compressed artifact of the compressed image from the second image, obtaining a third image by removing the compressed artifact by applying a deep neural network (DNN) for removing the compressed artifact to the noise, and reconstructing the compressed image by summing the first image and the third image.

7 Claims, 9 Drawing Sheets

(51) Int. Cl.
*G06T 5/20* (2006.01)
*G06T 5/50* (2006.01)

(52) U.S. Cl.
CPC ............... *G06T 2207/20081* (2013.01); *G06T 2207/20084* (2013.01); *G06T 2207/20224* (2013.01)

(56) References Cited

U.S. PATENT DOCUMENTS

| | | | | |
|---|---|---|---|---|
| 10,311,337 | B1 * | 6/2019 | Kim | G06F 18/217 |
| 10,362,308 | B2 | 7/2019 | Ryu et al. | |
| 2018/0144444 | A1 | 5/2018 | Nakamori et al. | |
| 2020/0034998 | A1 * | 1/2020 | Schlemper | G01R 33/4824 |
| 2020/0401889 | A1 | 12/2020 | Lee et al. | |
| 2022/0327692 | A1 * | 10/2022 | Park | G06N 3/0455 |

FOREIGN PATENT DOCUMENTS

| | | | |
|---|---|---|---|
| JP | 2015-154454 | A | 8/2015 |
| KR | 10-2018-0010950 | A | 1/2018 |
| KR | 10-2018-0033874 | A | 4/2018 |
| KR | 10-2018-0108288 | A | 10/2018 |
| KR | 10-2019-0109820 | A | 9/2019 |

OTHER PUBLICATIONS

He, K., Sun, J., Tang, X. (2010). Guided Image Filtering. In: Daniilidis, K., Maragos, P., Paragios, N. (eds) Computer Vision—ECCV 2010. ECCV 2010. Lecture Notes in Computer Science, vol. 6311. Springer, Berlin, Heidelberg. https://doi.org/10.1007/978-3-642-15549-9_1.*

Zhang, J., & Huang, D. (2019). Image Super-Resolution Reconstruction Algorithm Based on FSRCNN and Residual Network. In 2019 IEEE 4th International Conference on Image, Vision and Computing (ICIVC) (pp. 241-246).*

Jin, Z., Iqbal, M., Bobkov, D., Zou, W., Li, X., & Steinbach, E. (2020). A Flexible Deep CNN Framework for Image Restoration. IEEE Transactions on Multimedia, 22(4), 1055-1068.*

David Jenkins, M., Carr, T., Iglesias, M., Buggy, T., & Morison, G. (2018). A Deep Convolutional Neural Network for Semantic Pixel-Wise Segmentation of Road and Pavement Surface Cracks. In 2018 26th European Signal Processing Conference (EUSIPCO) (pp. 2120-2124).*

ISR and Written Opinion (PCT/ISA/220, PCT/ISA/210, and PCT/ISA/237) issued Aug. 20, 2021 by the International Searching Authority in International App No. PCT/KR2021/006074.

Zhang et al., "One-Two-One Networks for Compression Artifacts Reduction in Remote Sensing," arXiv: 1804.00256v1 [cs.CV], Apr. 1, 2018, 32 total pages.

Zhang et al., "DMCNN: Dual-Domain Multi-Scale Convolutional Neural Network for Compression Artifacts Removal," arXiv:1806.03275v2 [cs.CV], Jun. 11, 2018, 5 total pages.

Bennacer et al., "Artifact reduction in JPEG2000 compressed images at low bit-rate using mathematical morphology filtering," Springer, SIViP (2014) 8, Dec. 6, 2013, DOI 10.1007/s11760-013-0583-6, 10 total pages.

Dong et al., "Compression Artifacts Reduction by a Deep Convolutional Network," CVF, 2015, 9 total pages.

Zhang et al., "Beyond a Gaussian Denoiser: Residual Learning of Deep CNN for Image Denoising," arXiv:1608.03981v1 [cs.CV], Aug. 16, 2016, 13 total pages.

Dabov et al., "Image Denoising by Sparse 3-D Transform-Domain Collaborative Filtering," IEEE Transactions on Image Processing, vol. 16, No. 8, Aug. 2007, 16 total pages.

Communication issued Feb. 17, 2025 by the Korean Intellectual Property Office in Korean Patent Application No. 10-2020-0158043.

* cited by examiner

METHOD AND DEVICE FOR EXTRACTING NOISE OF COMPRESSED IMAGE, AND METHOD AND DEVICE FOR REDUCING NOISE OF COMPRESSED IMAGE

CROSS-REFERENCE TO RELATED APPLICATIONS

This application is a Continuation Application of International Application PCT/KR2021/006074 filed on May 14, 2021, which claims benefit of Korean Patent Application No. 10-2020-0058331 filed on May 15, 2020, at the Korean Intellectual Property Office, and Korean Patent Application No. 10-2020-0158043 filed on Nov. 23, 2020, at the Korean Intellectual Property Office, the disclosures of which are incorporated herein in their entireties by reference.

BACKGROUND

1. Field

The present disclosure relates to a method and apparatus for extracting and reducing noise of a compressed image, and more particularly, to a method and apparatus for extracting and reducing noise including a compressed artifact occurring in compression of an image, based on artificial intelligence (AI).

2. Description of Related Art

An image is encoded by a codec according to data compression standards, e.g., the moving picture expert group (MPEG) standards, etc., and is stored in a recording medium or transmitted through a communication channel, in the form of a bitstream.

In image compression, a compressed artifact may occur. Thus, there is a need to improve the quality of a compressed image by reducing the compressed artifact.

SUMMARY

The present disclosure provides a method of extracting noise of a compressed image and a method and apparatus for reducing the noise of the compressed image, in which structural information having a high probability of reconstruction and a high-frequency noise region having a high damage probability are separated from the compressed image based on artificial intelligence (AI) to reduce a compressed artifact occurring in image compression, thereby improving the quality of the compressed image.

In an embodiment, a method of extracting noise of a compressed image, provided in the present disclosure, includes obtaining a first image by applying a convolution filter, which sequentially performs down-convolution and up-convolution corresponding to the down-convolution, to a compressed image of an original image, obtaining a second image by subtracting the first image from the compressed image, and obtaining noise including high-frequency information and a compressed artifact of the compressed image from the second image.

In an embodiment, a method of reducing noise of a compressed image, provided in the present disclosure, includes obtaining a first image by applying a convolution filter, which sequentially performs down-convolution and up-convolution corresponding to the down-convolution, to a compressed image of an original image, obtaining a second image by subtracting the first image from the compressed image, obtaining noise including high-frequency information and a compressed artifact of the compressed image from the second image, obtaining a third image by removing the compressed artifact by applying a deep neural network (DNN) for removing the compressed artifact to the noise, and reconstructing the compressed image by summing the first image and the third image.

In an embodiment, an apparatus for extracting noise of a compressed image, provided in the present disclosure, includes a memory storing one or more instructions and a processor configured to execute the one or more instructions stored in the memory, in which the processor is further configured to obtain a first image by applying a convolution filter, which sequentially performs down-convolution and up-convolution corresponding to the down-convolution, to a compressed image of an original image, obtain a second image by subtracting the first image from the compressed image, and obtain noise including high-frequency information and a compressed artifact of the compressed image from the second image.

In an embodiment, an apparatus for reducing noise of a compressed image, provided in the present disclosure, includes a memory storing one or more instructions and a processor configured to execute the one or more instructions stored in the memory, in which the processor is further configured to obtain a first image by applying a convolution filter, which sequentially performs down-convolution and up-convolution corresponding to the down-convolution, to a compressed image of an original image, obtain a second image by subtracting the first image from the compressed image, obtain noise including high-frequency information and a compressed artifact of the compressed image from the second image, obtain a third image by removing the compressed artifact by applying a deep neural network (DNN) for removing the compressed artifact to the noise, and reconstruct the compressed image by summing the first image and the third image.

In one embodiment, disclosed is a method of extracting noise of a compressed image, the method including: obtaining a first image by applying a convolution filter, the convolution filter sequentially performing down-convolution and up-convolution corresponding to the down-convolution, to the compressed image of an original image; obtaining a second image by subtracting the first image from the compressed image; and obtaining from the second image, noise including high-frequency information of the compressed image and a compressed artifact of the compressed image.

In one embodiment, disclosed is a method of reducing noise of a compressed image, the method including: obtaining a first image by applying a convolution filter, the convolution sequentially performing down-convolution and up-convolution corresponding to the down-convolution, to the compressed image of an original image; obtaining a second image by subtracting the first image from the compressed image; obtaining from the second image, noise including high-frequency information of the compressed image and a compressed artifact of the compressed image; obtaining a third image by removing the compressed artifact by applying a deep neural network (DNN) for removing the compressed artifact, to the noise; and reconstructing the compressed image by summing the first image and the third image.

In one embodiment, disclosed is an apparatus for reducing noise of a compressed image, the apparatus including: a memory storing one or more instructions; and a processor configured to execute the one or more instructions stored in the memory, wherein the processor is further configured to: obtain a first image by applying a convolution filter, the convolution filter sequentially performing down-convolution and up-convolution corresponding to the down-convolution, to a compressed image of an original image; obtain a second image by subtracting the first image from the compressed image; obtain from the second image, noise including high-frequency information of the compressed image and a compressed artifact of the compressed image; obtain a third image by removing the compressed artifact by applying a deep neural network (DNN) for removing the compressed artifact to the noise; and reconstruct the compressed image by summing the first image and the third image.

By separating a compressed image into an image including low-frequency information and intermediate-frequency information and an image including noise including high-frequency information and a compressed artifact by using a convolution filter including down-convolution and up-convolution operations and subtraction and summation operations so as to extract the noise, inputting the image including the noise including the high-frequency information and the compressed artifact to a deep neural network (DNN) for removing the compressed artifact to remove the compressed artifact, and then summing the image having the compressed artifact removed therefrom with the image including the low-frequency information and the intermediate-frequency information, the quality of the compressed image may be improved.

DESCRIPTION OF DRAWINGS

Brief descriptions about respective drawings are provided to gain a sufficient understanding of the drawings of the present specification.

DETAILED DESCRIPTION

Figure 1:
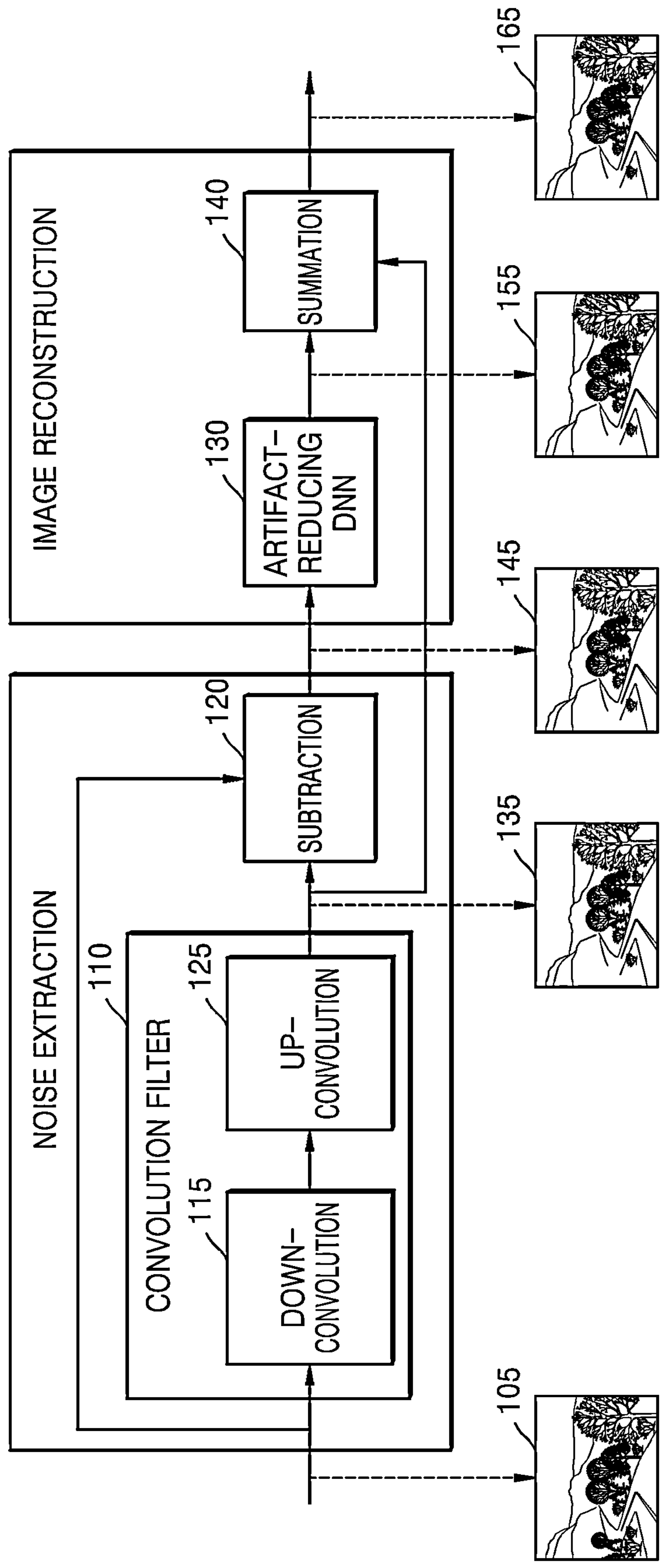
FIG. 1 is a view for describing a method of extracting and reducing noise of a compressed image, according to an embodiment.

According to an embodiment of the present disclosure, a method of extracting noise of a compressed image includes obtaining a first image by applying a convolution filter, which sequentially performs down-convolution and up-convolution corresponding to the down-convolution, to a compressed image of an original image, obtaining a second image by subtracting the first image from the compressed image, and obtaining noise including high-frequency information and a compressed artifact of the compressed image from the second image.

According to an embodiment, the first image may include intermediate-frequency information and low-frequency information of the compressed image.

According to an embodiment, the convolution filter may be trained to obtain the first image including the intermediate-frequency information and the low-frequency information of the compressed image, with the compressed image as an input.

According to an embodiment, the down-convolution may be a convolution operation trained to reduce the size of the compressed image.

According to an embodiment, the up-convolution may be a convolution operation trained to increase the down-convoluted compressed image to the original size of the compressed image.

According to an embodiment, the down-convolution and the up-convolution may be transposed to each other.

According to another embodiment of the present disclosure, a method of reducing noise of a compressed image includes obtaining a first image by applying a convolution filter, which sequentially performs down-convolution and up-convolution corresponding to the down-convolution, to a compressed image of an original image, obtaining a second image by subtracting the first image from the compressed image, obtaining noise including high-frequency information and a compressed artifact of the compressed image from the second image, obtaining a third image by removing the compressed artifact by applying a deep neural network (DNN) for removing the compressed artifact to the noise, and reconstructing the compressed image by summing the first image and the third image.

According to an embodiment, the DNN for removing the compressed artifact may be trained to reduce the compressed artifact with high-frequency information and the compressed artifact of the compressed image as an input.

According to an embodiment, the DNN for removing the compressed artifact may include a convolution layer and an activation layer.

According to an embodiment, the DNN for removing the compressed artifact may further include a batch normalization layer.

According to an embodiment, the first image may include intermediate-frequency information and low-frequency information of the compressed image.

According to an embodiment, the convolution filter may be trained to obtain the first image including the intermediate-frequency information and the low-frequency information of the compressed image.

According to an embodiment, the down-convolution may be a convolution operation trained to reduce the size of the compressed image.

According to an embodiment, the up-convolution may be a convolution operation trained to increase the down-convoluted compressed image to the original size of the compressed image.

According to an embodiment, the down-convolution and the up-convolution may be transposed to each other.

According to another embodiment of the present disclosure, an apparatus for extracting noise of a compressed image includes a memory storing one or more instructions and a processor configured to execute the one or more instructions stored in the memory, in which the processor is further configured to obtain a first image by applying a convolution filter, which sequentially performs down-convolution and up-convolution corresponding to the down-convolution, to a compressed image of an original image, obtain a second image by subtracting the first image from the compressed image, and obtain noise including high-frequency information and a compressed artifact of the compressed image from the second image.

According to another embodiment of the present disclosure, an apparatus for reducing noise of a compressed image includes a memory storing one or more instructions and a processor configured to execute the one or more instructions stored in the memory, in which the processor is further configured to obtain a first image by applying a convolution filter, which sequentially performs down-convolution and up-convolution corresponding to the down-convolution, to a compressed image of an original image, obtain a second image by subtracting the first image from the compressed image, obtain noise including high-frequency information and a compressed artifact of the compressed image from the second image, obtain a third image by removing the compressed artifact by applying a deep neural network (DNN) for removing the compressed artifact to the noise, and reconstruct the compressed image by summing the first image and the third image.

While embodiments of the present disclosure are susceptible to various modifications and alternative forms, specific embodiments thereof are shown by way of example in the drawings and will herein be described in detail. It should be understood, however, that there is no intent to limit embodiments of the present disclosure to the particular forms disclosed, but conversely, embodiments of the present disclosure are to cover all modifications, equivalents, and alternatives falling within the scope of the disclosure.

In the following description of the present disclosure, a detailed description of known functions and configurations incorporated herein will be omitted when it may make the subject matter of the present disclosure unclear. Moreover, a number (e.g., a first, a second, etc.) used in a process of describing the present specification is merely an identification symbol for distinguishing one component from another component.

Moreover, herein, when a component is mentioned as being "connected" or "coupled" to another component, it may be directly connected or directly coupled to the another component, but unless described otherwise, it should be understood that the component may also be connected or coupled to the another component via still another component therebetween.

In the present disclosure, two or more elements expressed as "units", "modules", or the like may be combined into one element, or one element may be divided into two or more elements for subdivided functions. Each element described herein may not only perform main functions thereof but also additionally perform some or all functions of other elements, and some main functions of each element may be exclusively performed by another element.

As used herein, the term 'image' or 'picture' may refer to a still image, a moving image including a plurality of consecutive still images (or frames), or a video.

Herein, a 'deep neural network (DNN)' is a representative example of an artificial neural network model simulating a brain nerve, and is not limited to an artificial neural network model using a specific algorithm.

Herein, a 'parameter' may be a value used in an operation process of each layer constituting a neural network, and may include, for example, a weight used in application of an input value to a predetermined calculation formula. The parameter may be expressed in the form of a matrix. The parameters are values set as a result of training, and may be updated based on separate training data when necessary.

Herein, a 'convolution filter' means a trained filter used to obtain an image having intermediate-frequency and low-frequency information of a compressed image by sequentially performing down-convolution and up-convolution on the compressed image, and is a type of a DNN in that two convolution operations are performed and trained, and a 'DNN for removing an AI compressed artifact' means a DNN used to remove a compressed artifact of an image having high-frequency information and the compressed artifact of the compressed image.

Herein, 'filter setting information' includes the above-described parameter as information related to the convolution filter. The convolution filter may be set using the filter setting information.

Herein, 'DNN setting information' may include the above-described parameter as information related to an element constituting the DNN. The DNN for removing the AI compressed artifact may be set using the DNN setting information.

Herein, the 'original image' means an image subject to image compression, the 'compressed image' means an image generated as a result of image compression with respect to the original image, and a 'first image' means an image to which a convolution filter that sequentially performs down-convolution and up convolution is applied. A 'second image' means an image obtained by subtracting the first image from the compressed image, a 'third image' means an image obtained by removing an AI compressed artifact from the second image in a compressed artifact removal process, and a 'reconstructed image' means an image obtained by summing the first image with the third image.

Herein, 'subtraction' means element-wise subtraction that subtracts a pixel value per pixel of an image, and 'summation' means element-wise summation that sums pixel values per pseudo pixel.

Herein, the 'compressed artifact' means an error occurring due to damage of a vicinity of an edge and a texture in image compression, and the compressed artifact generally includes a block artifact, a ringing artifact, etc.

FIG. 1 is a view for describing a method of extracting and reducing noise of a compressed image, according to an embodiment.

In a compressed image generated by image compression of the original image, noise including a compressed artifact occurring in compression is generated, such that a scheme is required to effectively separate and extract the noise and effectively reduce the compressed artifact included in the noise.

The compressed image includes a region including structural information (low-frequency band information and intermediate-frequency band information) having a high probability of reconstruction and a high-frequency noise region (high-frequency band information and the compressed artifact) having a high damage probability.

As shown in FIG. 1, according to an embodiment of the present disclosure, a compressed image 105 may be applied to a convolution filter 110 that sequentially performs down-convolution 115 and up-convolution 125 to obtain a first image 135, and the first image 135 may be subtracted from the compressed image 105 to obtain a second image 145. The second image 145 may be input to an artifact-reducing DNN 130 to obtain a third image 155, and the first image 135 and the third image 155 may be summed to obtain a reconstructed image 165.

The convolution filter 110 may be a filter that sequentially performs down-convolution 115 and up-convolution 125 corresponding thereto, and may be trained to obtain the first image 135 including low-frequency and intermediate-frequency information of the compressed image 105 using the compressed image 105 as an input. That is, the first image 135 having the low-frequency and intermediate-frequency information may be obtained as a result of applying the convolution filter 110, and the first image 135 may be subtracted from the compressed image 105 to obtain the second image 145 having high-frequency information and a compressed artifact of the compressed image 105. A convolution operation of the convolution filter will be described with reference to FIG. 2, and a training scheme for the convolution filter will be described later with reference to FIG. 6.

That is, the artifact-reducing DNN 130 may be trained to obtain the third image 155 from which the compressed artifact is reduced, using the second image 145 having the high-frequency information and the compressed artifact of the compressed image 105 as an input. That is, the third image 155 from which the compressed artifact is reduced as a result of applying the artifact-reducing DNN 130 may be obtained, and the first image 135 and the third image 155 may be summed to obtain the reconstructed image 165 from which the compressed artifact is reduced, from the compressed image 105. A structure of the artifact-reducing DNN 130 will be described later with reference to FIG. 3, and a training scheme for the artifact-reducing DNN 130 will be described later with reference to FIG. 7.

The method of extracting the noise including the compressed artifact and reducing the compressed artifact may be performed several times. Moreover, the method may also be performed per block of an image or several times per block of the image. Moreover, when removal of the compressed artifact is required after image compression, the method of extracting the noise including the compressed image and reducing the compressed artifact may be applied to any stage.

When the artifact is reduced based on the AI without separating the compressed image into the image including the low-frequency and intermediate-frequency information and the image including the compressed artifact, the compressed artifact that needs to be reduced and an artifact that needs to be maintained may not be distinguished from each other, such that the compressed artifact may not be separately reduced. However, as described with reference to FIG. 1, the compressed image may be separated into the image including the low-frequency and intermediate-frequency information and the image including the compressed artifact and the high-frequency information related to the compressed artifact by using the trained convolution filter, and the compressed artifact may be removed from the image including the high-frequency information and the compressed artifact by using the trained artifact-reducing DNN, thereby intensively reducing the compressed artifact that is generated in image compression and is absent from the original image.

Figure 2:
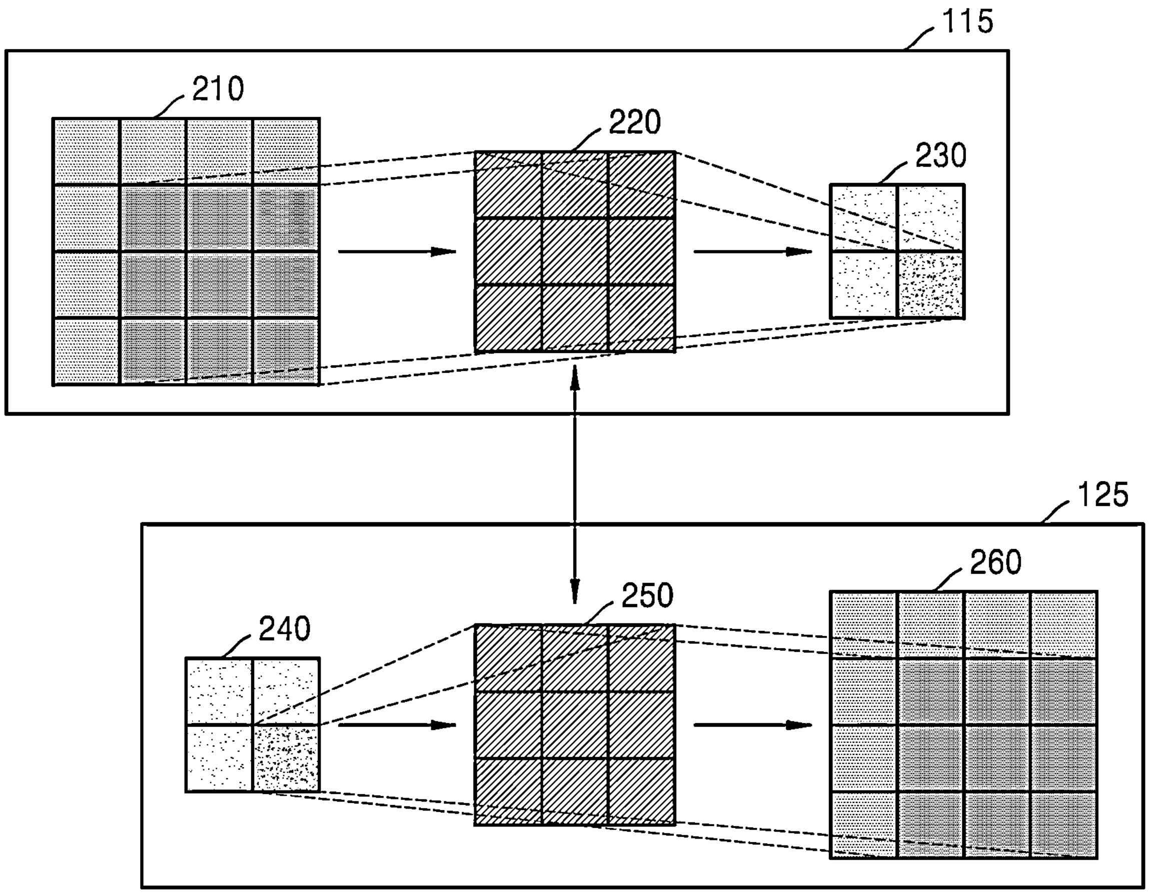
FIG. 2 is an example view showing down-convolution and up-convolution operations performed in a convolution filter.

FIG. 2 is an example view showing down-convolution and up-convolution operations performed in a convolution filter.

As shown in FIG. 2, the down-convolution 115 may be a convolution operation that obtains an output feature map 230 of 2×2 with a reduced feature map size by convolution that applies a down-filter kernel 220 of 3×3 to an input feature map 210 of 4×4 according to a stride, and the up-convolution 125, which is transposed to the down-convolution 115, may be a convolution operation that obtains an output feature map 260 of 4×4 with a feature map size increasing to the original size by convolution that applies an up-filter kernel 250 of 3×3 corresponding to the down-filter kernel 220 to the input feature map 240 with a reduced feature map size according to a stride.

By obtaining the output feature map 230 with a reduced size compared to the input feature map 210 through the down-convolution 115, input information corresponding to a high-frequency region is lost as much as deleted pixels, but thereafter, a feature map size may increase through the up-convolution 125 to reconstruct the number of pixels.

That is, the output feature map 230 of a small dimension with the high-frequency information lost may be obtained while reducing the input feature map 210 having large-dimension information to a small dimension through a down-convolution operation using a trained filter kernel, and the output feature map 260 with the original large dimension may be obtained while expanding the small-dimension input feature map 240 to a large dimension through an up-convolution operation using a trained filter kernel corresponding to the down-convolution operation.

Thus, the first image 135 including the low-frequency and intermediate-frequency information of the compressed image 105 input to the convolution filter may be obtained.

According to an embodiment, the convolution filter may be a DNN including one convolution layer that performs down-convolution and one convolution layer that performs up-convolution.

By using a trained convolution filter that sequentially performs a convolution operation that reduces a size and transposed convolution that enlarges a size rather than a fixed filter using size reduction and size enlargement of an interpolation scheme, an image of a noise region including the high-frequency information and the compressed artifact may be effectively separated from the compressed image as a result of subtracting a convolution-filtered image from the compressed image. By applying the image of the noise region separated in this way to the DNN for removing the compressed artifact described later with reference to FIG. 3, the compressed artifact may be effectively reduced.

The convolution operations described with reference to FIG. 2 are merely examples, and the present disclosure are not limited thereto.

Figure 3:
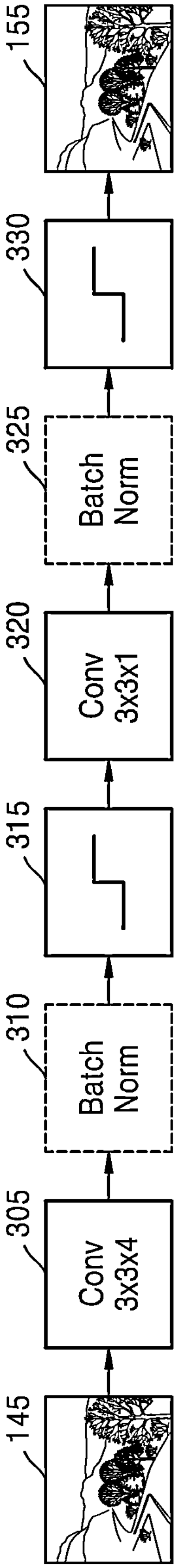
FIG. 3 is an example view showing a deep neural network (DNN) for removing a compressed artifact.

FIG. 3 is an example view showing a DNN for removing a compressed artifact.

As shown in FIG. 3, the second image 145 having noise including the high-frequency information and the compressed artifact of the compressed image 105 may be input to a first convolution layer 305. 3×3×4 marked on the first convolutional layer 305 shown in FIG. 3 represents that convolution is performed on one input image by using four 3×3 filter kernels. Four feature maps are generated by four filter kernels as the convolution result. Each feature map may indicate unique features of the second image 145. For example, each feature map may indicate a vertical feature, a horizontal feature, and an edge feature of the second image 145, a feature shown in the compressed artifact, etc.

Feature maps generated as the convolution result may be input to a batch normalization layer that calculates an average and a standard deviation for each feature and normalizes them in the unit of a batch. A batch normalization method performs normalization and learning in the unit of a mini batch to improve the speed of learning. Herein, a batch may mean a part of data.

Feature maps output from the first convolution layer 305 may be input to the first batch normalization layer 310 and then to a first activation layer 315.

In another example, batch normalization, which is one option, may be immediately input to the first activation layer 315 without performing batch normalization on the feature maps output from the first convolution layer 305.

The first activation layer 315 may give a non-linear feature to each feature map. The first activation layer 315 may include a sigmoid function, a tangent (tanh) function, a rectified linear unit (ReLU) function, etc., but the present disclosure is not limited thereto.

Giving the non-linear feature to the first activation layer 315 may mean changing and outputting the first convolution layer 305 or a partial sample value of a feature map, which is an output of the first convolution layer 305 and the first batch normalization layer 310. In this case, the change may be performed by applying the non-linear feature.

The first activation layer 315 may determine whether to transmit output sample values of feature maps to a second convolutional layer 320. For example, some of the sample values of the feature maps may be activated by the first activation layer 315 and transmitted to the second convolutional layer 320, and other sample values may be inactivated by the first activation layer 315 and not transmitted to the second convolutional layer 320. Among features of the second image 145 where the features maps appear, a feature corresponding to the compressed artifact may be inactivated and a feature not corresponding to the compressed artifact may be enhanced by the first activation layer 315.

The feature maps output from the first activation layer 315 may be input to the second convolutional layer 320. 3×3×1 marked on the second convolutional layer 320 shown in FIG. 3 represents that convolution is performed on one output image by using one 3×3 filter kernel. The second convolution layer 320 may generate one output by using one filter kernel as a layer for outputting a final image. The second convolution layer 320 may be input to a second batch normalization layer 325 and then to the second activation layer 330.

In another example, batch normalization, which is one option, may be immediately input to the second activation layer 330 without performing batch normalization on the feature maps output from the second convolution layer 320.

According to an embodiment, the second activation layer 330 may output the third image 155 by removing the compressed artifact included in the second image 145.

FIG. 3 shows that the artifact-reducing DNN 130 includes two convolution layers, i.e., the first and the second convolution layers 305 and 320 and two activation layers, i.e., the first and the second activation layers 315 and 330 and optionally includes two batch normalization layers, i.e., the first and the second batch normalization layers 310 and 325, but this is merely an example and the number of convolution layers, the number of activation layers, and the number of batch normalization layers may change variously according to an implementation example. Depending on an implementation example, the artifact-reducing DNN 130 may be implemented as a recurrent neural network (RNN). This means that a convolutional neural network (CNN) architecture of the artifact-reducing DNN 130 according to an example of the present disclosure is changed to an RNN architecture.

As will be described later with reference to FIG. 7, the DNN for removing the compressed artifact is trained to obtain the third image from which the compressed artifact not included in the original image is removed while maintaining the high-frequency information included in the original image to the maximum by inputting the second image having the noise including the high-frequency information and the compressed artifact of the compressed image, thereby effectively removing the compressed artifact. Thereafter, by summing the first image having the low-frequency and intermediate-frequency information of the compressed image with the third image, the compressed artifact of the compressed image may be merely reduced, thereby obtaining a reconstructed image with quality improved close to the original image.

The convolution process described with reference to FIG. 3 is merely an example, and the present disclosure is not limited thereto.

Figure 4:
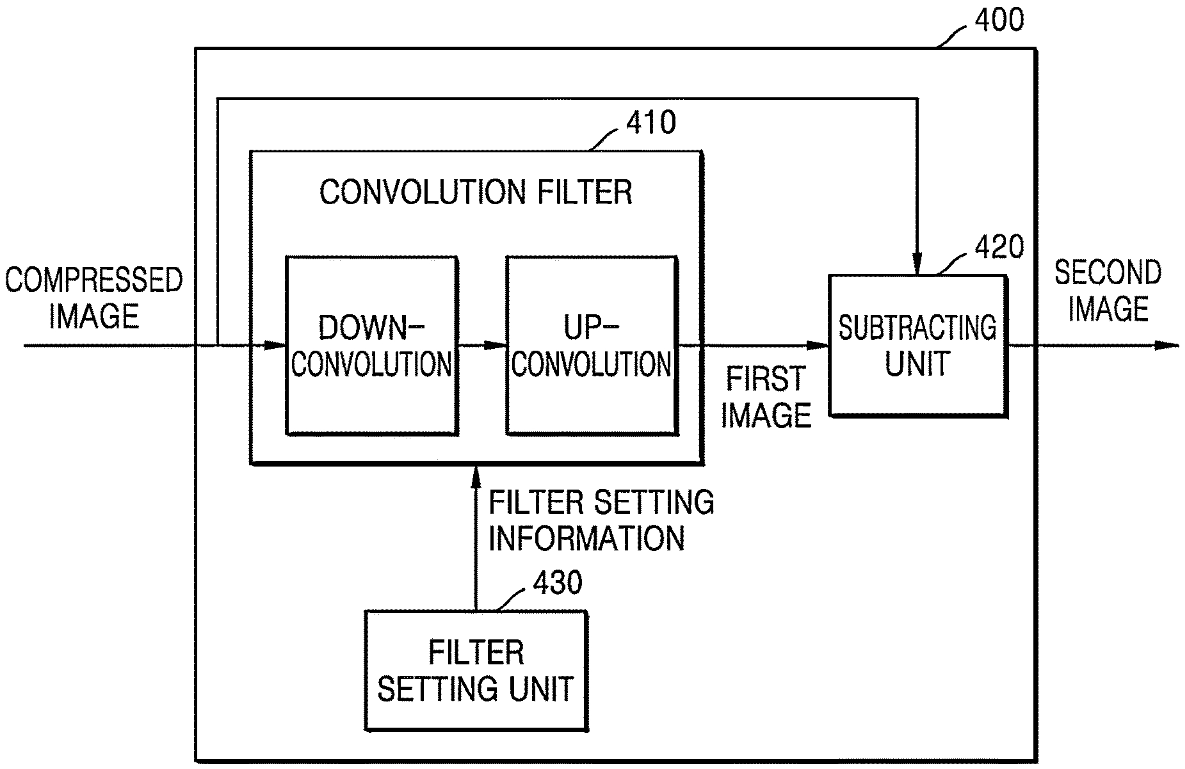
FIG. 4 is a block diagram of an apparatus for extracting noise of a compressed image, according to an embodiment.

FIG. 4 is a block diagram of an apparatus for extracting noise of a compressed image, according to an embodiment.

Referring to FIG. 4, an apparatus 400 for extracting noise of a compressed image may include a convolution filter 410, a subtracting unit 420, and a filter setting unit 430.

The convolution filter 410, the subtracting unit 420, and the filter setting unit 430 may be implemented through one processor. In this case, the convolution filter 410, the subtracting unit 420, and the filter setting unit 430 may be implemented as a dedicated processor, or through a combination of software (S/W) and a general-purpose processor such as an application processor (AP), a central processing unit (CPU), or a graphic processing unit (GPU). The dedicated processor may include a memory to implement an embodiment of the disclosure, or include a memory processor to use an external memory.

The convolution filter 410, the subtracting unit 420, and the filter setting unit 430 may be implemented as a plurality of processors. In this case, the convolution filter 410, the subtracting unit 420, and the filter setting unit 430 may be implemented as a combination of dedicated processors, or through a combination of software and a plurality of general-purpose processors such as APs, CPUs, or GPUs. In an embodiment, the convolution filter 410 may be implemented as a first processor, the subtracting unit 420 may be implemented as a second processor that is different from the first processor, and the filter setting unit 430 may be implemented as a third processor that is different from the first processor and the second processor.

The filter setting unit 430 may provide trained filter setting information corresponding to the compressed image 105 to the convolution filter 410 based on a predetermined criterion.

The filter setting unit 430 may store the filter setting information to obtain the first image 135 corresponding to the compressed image 105.

The filter setting information may have been trained to obtain the first image 135 having the low-frequency and intermediate-frequency information of the compressed image 105.

The filter setting information may include the number of filter kernels, the size of a filter kernel, a parameter of the filter kernel, etc.

The convolution filter 410 may sequentially perform down-convolution and up-convolution according to the filter setting information provided from the filter setting unit 430.

The convolution filter 410 may output the first image 135 with the compressed image 105 as an input by using the filter setting information provided from the filter setting unit 430.

The subtracting unit 420 may subtract the first image 135 output through application of the convolution filter 410 from the compressed image 105.

The subtracting unit 420 may output the second image 145 having noise including high-frequency information and a compressed artifact of the compressed image 105, as a result of subtraction.

Figure 5:
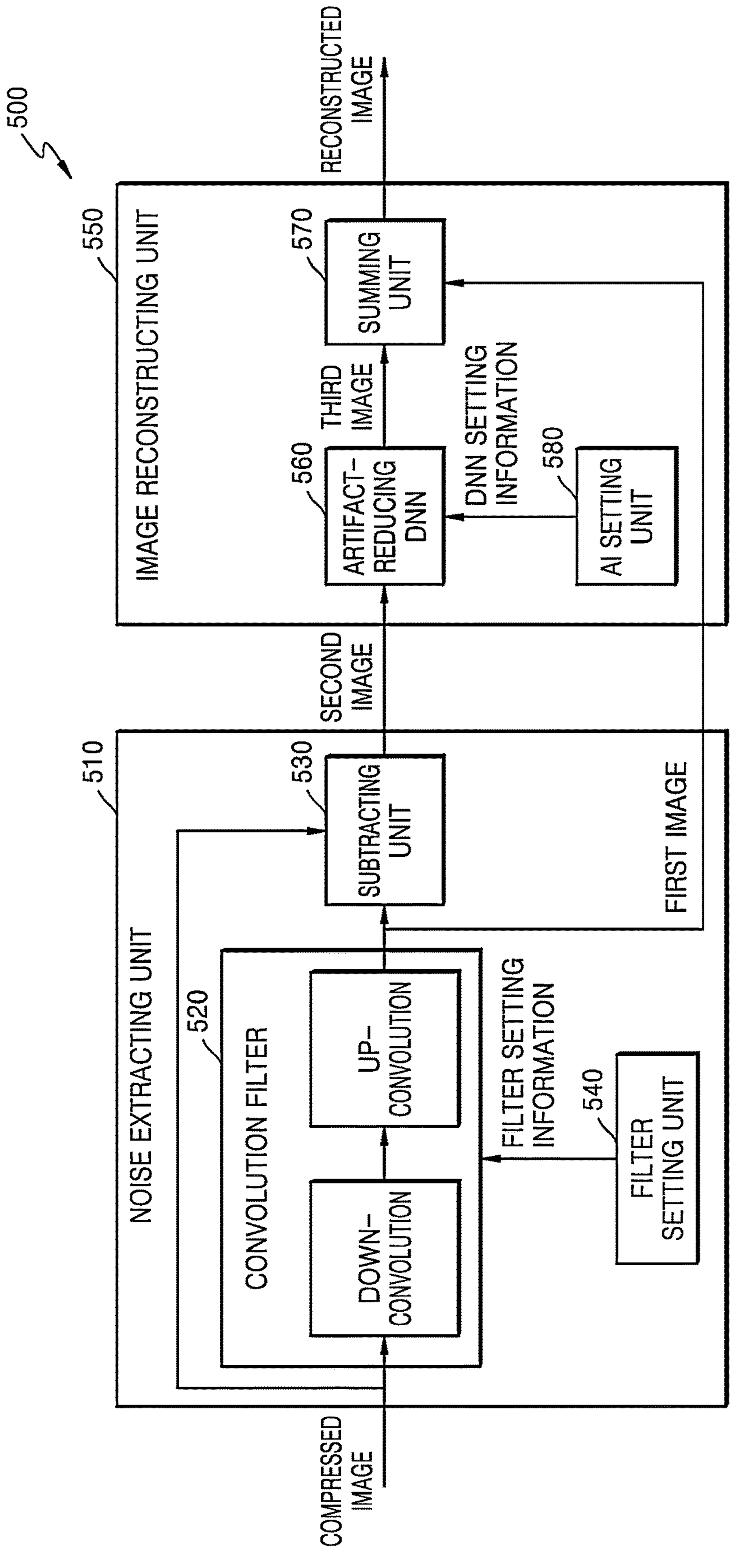
FIG. 5 is a block diagram of an apparatus for reducing noise of a compressed image, according to an embodiment.

FIG. 5 is a block diagram of an apparatus for reducing noise of a compressed image, according to an embodiment.

Referring to FIG. 5, an apparatus 500 for reducing noise of a compressed image according to an embodiment may include a noise extracting unit 510 and an image reconstructing unit 550. The noise extracting unit 510 may include a convolution filter 520, a subtracting unit 530, and a filter setting unit 540, and the image reconstructing unit 550 may include an artifact-reducing DNN 560, a summing unit 570, and an AI setting unit 580.

While the noise extracting unit 510 and the image reconstructing unit 550 are shown as separate units in FIG. 5, the noise extracting unit 510 and the image reconstructing unit 550 may be implemented through one processor. In this case, the noise extracting unit 510 and the image reconstructing unit 550 may be implemented as a dedicated processor, or through a combination of S/W and a general-purpose processor such as an AP, a CPU, or a GPU. The dedicated processor may include a memory to implement an embodiment of the disclosure, or include a memory processor to use an external memory.

The noise extracting unit 510 and the image reconstructing unit 550 may be configured as a plurality of processors. In this case, the noise extracting unit 510 and the image reconstructing unit 550 may be implemented as a combination of dedicated processors, or through a combination of S/W and a plurality of general-purpose processors such as APs, CPUs, or GPUs. In an embodiment, the convolution filter 520 and the subtracting unit 530 may be implemented as a first processor, the artifact-reducing DNN 560 and the summing unit 570 may be implemented as a second processor that is different from the first processor, and the filter setting unit 540 and the AI setting unit 580 may be implemented as a third processor that is different from the first processor and the second processor.

The filter setting unit 540 may provide trained filter setting information corresponding to the compressed image 105 to the convolution filter 520 based on a predetermined criterion.

The filter setting unit 540 may store the filter setting information to obtain the first image 135 corresponding to the compressed image 105.

The filter setting information may have been trained to obtain the first image 135 having the low-frequency and intermediate-frequency information of the compressed image 105.

The filter setting information may include the number of filter kernels, the size of a filter kernel, a parameter of the filter kernel, etc.

The convolution filter 520 may sequentially perform down-convolution and up-convolution according to the filter setting information provided from the filter setting unit 540.

The convolution filter 520 may output the first image 135 with the compressed image 105 as an input by using the filter setting information provided from the filter setting unit 540.

The subtracting unit 530 may subtract the first image 135 output using the convolution filter 520 from the compressed image 105.

The subtracting unit 530 may output the second image 145 having noise including high-frequency information and a compressed artifact of the compressed image 105, as a result of subtraction.

The AI setting unit 580 may provide the trained DNN setting information corresponding to the second image 145 to the artifact-reducing DNN 560 according to the predetermined criterion.

The AI setting unit 580 may store the DNN setting information to obtain the third image 155 in which the compressed artifact included in the second image 145 is reduced.

The DNN setting information has been trained to obtain the third image 155 in which the compressed artifact is removed from the second image 145 including the high-frequency information and the compressed artifact of the compressed image 105.

The DNN setting information may include information about at least one of the number of convolution layers included in the artifact-reducing DNN 560, the number of filter kernels for each convolution layer, and a parameter of each filter kernel.

The artifact-reducing DNN 560 may output the third image 155 in which the compressed artifact included in the second image 145 is removed, with the second image 156 as an input by using the DNN setting information provided in the AI setting unit 580.

The summing unit 570 may output the reconstructed image 165 by summing the first image 135 output through the convolution filter 520 of the noise extracting unit 510 with the third image 155 output through the artifact-reducing DNN 560. The first image 135 includes the low-frequency and intermediate-frequency information of the compressed image 105 and the third image 155 includes the high-frequency information of the compressed image 105, such that the summed reconstructed image is an image in which the compressed artifact is removed from the compressed image. Thus, the apparatus 500 for reducing the noise of the compressed image according to an embodiment may obtain the reconstructed image 165 in which the compressed artifact occurring in image compression, included in the compressed image 105, is removed.

Figure 6:
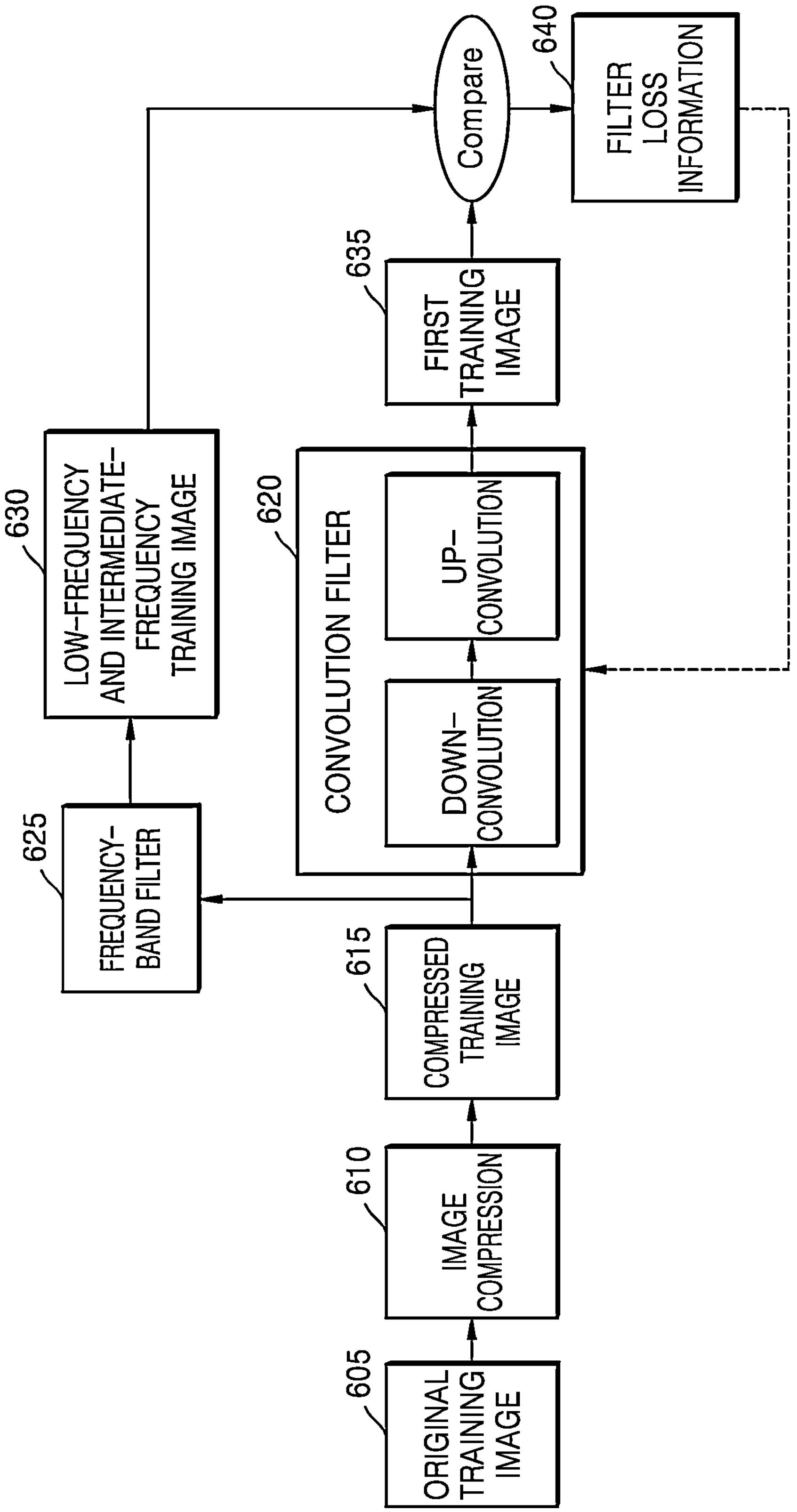
FIG. 6 is an example view for describing a method of training a convolution filter.

FIG. 6 is an example view for describing a method of training a convolution filter.

In FIG. 6, an original training image 605 may be an image that is subject to image compression 610, a compressed training image 615 may be obtained by image compression of the original training image 605, and a first training image 635 may be obtained by applying a convolution filter 620 that sequentially performs down-convolution and up-convolution to the compressed training image 615.

The original training image 605 may include a still image or a moving image including a plurality of frames. In an embodiment, the original training image 605 may include a luminance image extracted from the still image or the moving image including the plurality of frames. In addition, in an embodiment, the original training image 605 may include a patch image extracted from the still image or the moving image including the plurality of frames. When the original training image 605 includes the plurality of frames, the compressed training image 615, the first training image 635, and a low-frequency and intermediate-frequency training image 630 may also include a plurality of frames. When the plurality of frames of the original training image 605 are subject to the image compression 610, the plurality of frames of the compressed training image 615 may be obtained and the plurality of frames of the first training image 635 may be obtained through the convolution filter 620.

For the image compression 610 of the original training image 605, any one codec of the MPEG-2, H.264, MPEG-4, high efficiency video coding (HEVC), VC-1, VP8, VP9, and AV1.

Referring to FIG. 6, separately from outputting the first training image 635 through the convolution filter 620 with the compressed training image 615 as an input, the low-frequency and intermediate-frequency training image 630 filtered through a legacy frequency-band filter 625 may be obtained from the compressed training image 615. Herein, a cut-off frequency of the legacy frequency-band filter 625 may vary with a feature of a compressed training image. More specifically, the convolution filter is used to separate the compressed image into the low-frequency and intermediate-frequency information including structural information with a high probability of reconstruction and the high-frequency information and the artifact of the high-frequency noise with a high damage probability, such that the cut-off frequency of the legacy frequency-band filter may vary with the compressed training image.

The low-frequency and intermediate-frequency training image 630 may mean an image including the low-frequency and intermediate-frequency information of the compressed training image through the legacy frequency-band filter 625. For training of the convolution filter 620, the low-frequency and intermediate-frequency training image 630 including the low-frequency and intermediate-frequency information of the compressed training image may be obtained.

Before training, the convolution filter 620 may be set by predetermined filter setting information. As training progresses, filter loss information 640 may be determined.

The filter loss information 640 may be determined based on a result of comparison between the first training image 635 and the low-frequency and intermediate-frequency training image 630.

The filter loss information 640 may include at least one of an L1-norm value and an L2-norm value regarding a difference between the first training image 635 and the low-frequency and intermediate-frequency training image 630, a structural similarity (SSIM) value, a peak signal-to-noise (PSNR)-human vision system (HVS) value, a multiscale (MS)-SSIM value, a variance inflation factor (VIF) value, and a video multimethod assessment fusion (VMAF) value. The filter loss information 640 may indicate an extent to which the first training image 635 is similar to the low-frequency and intermediate-frequency training image 630. As the filter loss information 640 decreases, the first training image 635 becomes more similar to the low-frequency and intermediate-frequency training image 630.

The convolution filter 620 may update a parameter to reduce or minimize the filter loss information 640.

Final loss information of the convolution filter 620 may be determined as Equation 1 provided below.

$$\text{LossCF}=a*\text{Filter Loss Information} \quad \text{[Equation 1]}$$

In Equation 1, LossCF may indicate final loss information that needs to be reduced or minimized for training of the convolution filter 620 and a may indicate a predetermined weight.

That is, the convolution filter 620 may update parameters in a direction to reduce LossCF of Equation 1. When the parameters of the convolution filter 620 are updated based on LossCF derived in a training process, the first training image 635 obtained based on the updated parameters may differ with the first training image 635 of a previous training process.

Figure 7:
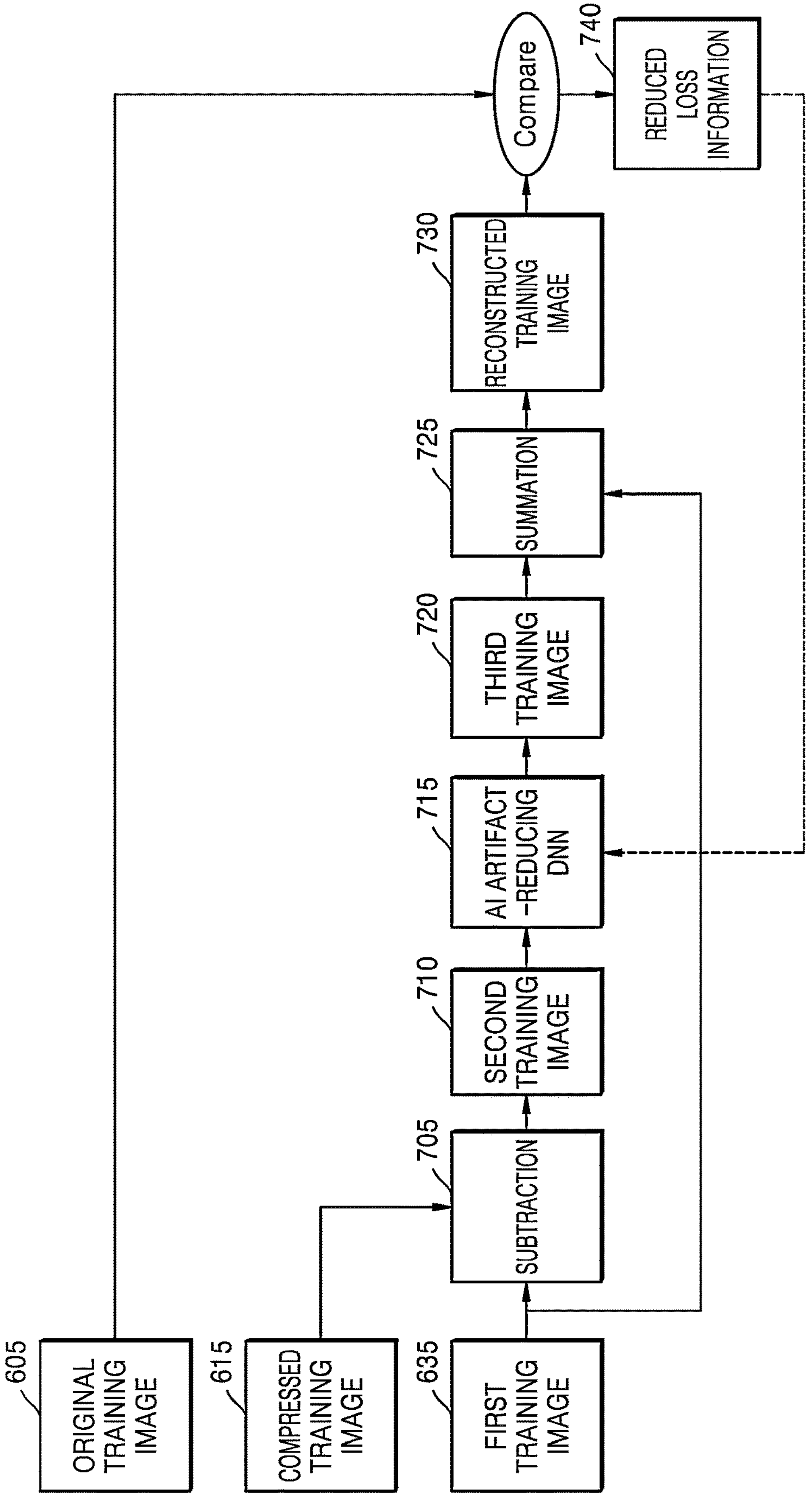
FIG. 7 is an example view for describing a method of training a DNN for reducing an artificial intelligence (AI) artifact.

FIG. 7 is an example view for describing a method of training a DNN for reducing an AI artifact.

In FIG. 7, the original training image 605 may be an image to be compared with a reconstructed training image 730, and the compressed training image 615 may be obtained by image compression of the original training image 605. The first training image 635 may be obtained by applying the convolution filter 620, which has been trained in the training process of FIG. 6, to the compressed training image 615. A second training image 710 may be obtained by subtraction 705 of the first training image 635 from the compressed training image 615, a third training image 720 may be an image output through an AI artifact-reducing DNN 715 with the second training image 710 as an input, and a reconstructed training image 730 may be obtained by summation 725 of the first training image 635 with the third training image 720.

Herein, the first training image 635 may result from applying the convolution filter 620, which has been trained, to the compressed training image 615. This is because the convolution filter 620 is trained for effective separation into the first image 135 having the low-frequency and intermediate-frequency information and the second image 145 having the high-frequency information and the compressed artifact, and the AI artifact-reducing DNN 715 is trained for effective removal of the compressed artifact of the second image 145. That is, the convolution filter 620 and the AI artifact-reducing DNN 715 have to be independently trained.

The original training image 605 may include a still image or a moving image including a plurality of frames. In an embodiment, the original training image 605 may include a luminance image extracted from the still image or the moving image including the plurality of frames. In addition, in an embodiment, the original training image 605 may include a patch image extracted from the still image or the moving image including the plurality of frames. When the original training image 605 includes the plurality of frames, the compressed training image 615, the first training image 635, the second training image 710, and the third training image 720 may also include a plurality of frames. When the plurality of frames of the original training image 605 are subject to the image compression 610, the plurality of frames of the compressed training image 615 are obtained, the plurality of frames of the first training image 635 are obtained through the convolution filter 620 that has been trained, the plurality of frames of the second training image 710 are obtained through the subtraction 705 of the first training image 635 from the compressed training image 615, the plurality of frames of the third training image 720 are obtained through the AI artifact-reducing DNN 715, and the plurality of frames of the reconstructed training image 730 are obtained through the summation 725 of the first training image 635 and the third training image 720.

Before training, the AI artifact-reducing DNN 715 may be set with predetermined DNN setting information. As training progresses, reduced loss information 740 may be determined.

The reduced loss information 740 may be determined based on a result of comparison between the original training image 605 and the reconstructed training image 730.

The reduced loss information 740 may include at least one of an L1-norm value and an L2-norm value regarding a difference between the original training image 605 and the reconstructed training image 730, an SSIM (structural similarity) value, a PSNR-HVS (peak signal-to-noise-human vision system) value, an MS-SSIM (multiscale-SSIM)

value, a VIF (variance inflation factor) value, and a VMAF (video multimethod assessment fusion) value. The reduced loss information 740 may indicate an extent to which the reconstructed training image 730 is similar to the original training image 605. As the reduced loss information 740 decreases, the reconstructed training image 730 becomes more similar to the original training image 605. That is, the reconstructed training image with the reduced compressed artifact occurring due to image compression of the original training image may be obtained.

The AI artifact-reducing DNN 715 may update a parameter to reduce or minimize the reduced loss information 740.

Final loss information of the AI artifact-reducing DNN 715 may be determined as Equation 2 below.

$$\text{LossAR}=b*\text{Reduced Loss Information} \quad \text{[Equation 2]}$$

In Equation 2, LossAR may indicate final loss information that needs to be reduced or minimized for training of the AI artifact-reducing DNN 715 and b may indicate a predetermined weight.

That is, the AI artifact-reducing DNN 715 may update parameters in a direction to reduce LossAR of Equation 2. When the parameters of the AI artifact-reducing DNN 715 are updated based on LossAR derived in the training process, the third training image 720 obtained based on the updated parameters may differ with the third training image 720 of the previous training process.

Figure 8:
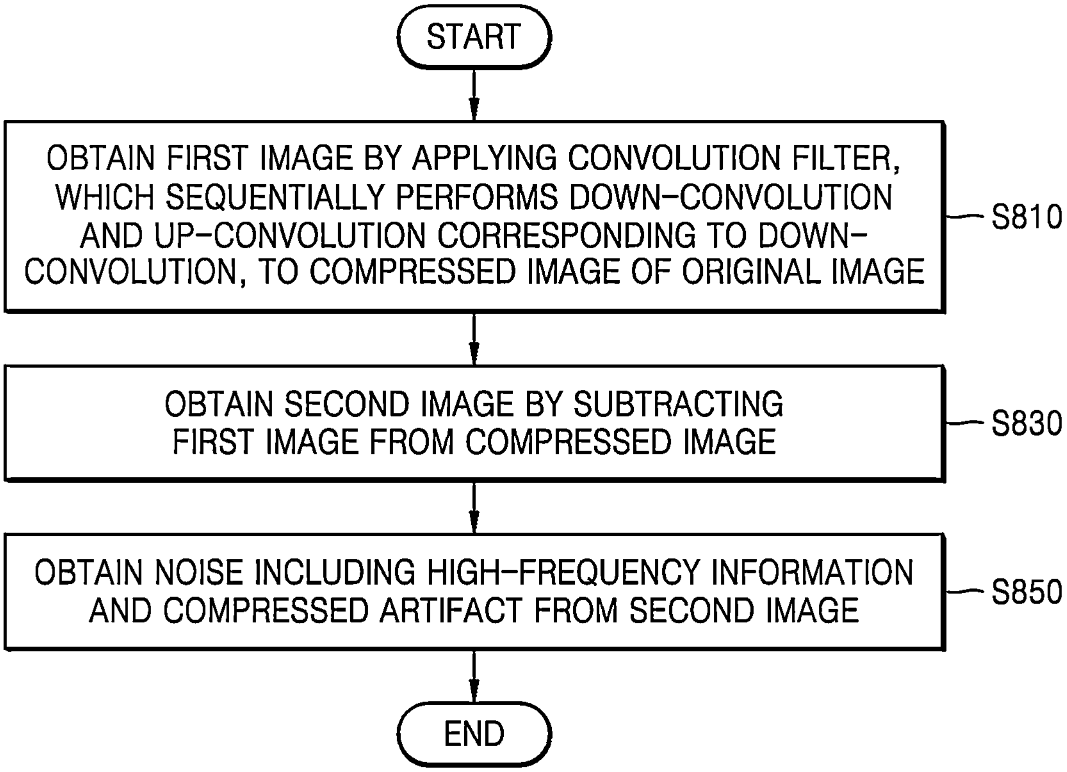
FIG. 8 is a flowchart for describing a method of extracting noise of a compressed image, according to an embodiment.

FIG. 8 is a flowchart for describing a method of extracting noise of a compressed image, according to an embodiment.

In operation S810, the apparatus 400 for extracting noise of a compressed image may obtain a first image by applying a convolution filter, which sequentially performs down-convolution and up-convolution corresponding to the down-convolution, to a compressed image of an original image.

According to an embodiment, the first image may include intermediate-frequency information and low-frequency information of the compressed image.

According to an embodiment, the convolution filter may be trained to obtain the first image including the intermediate-frequency information and the low-frequency information of the compressed image, with the compressed image as an input.

According to an embodiment, the down-convolution may be a convolution operation trained to reduce the size of the compressed image.

According to an embodiment, the up-convolution may be a convolution operation trained to increase the down-convoluted compressed image to the original size of the compressed image.

According to an embodiment, the down-convolution and the up-convolution may be transposed to each other.

In operation S830, the apparatus 400 for extracting the noise of the compressed image may obtain a second image by subtracting the first image from the compressed image.

In operation S850, the apparatus 400 for extracting the noise of the compressed image may obtain noise including high-frequency information and a compressed artifact of the compressed image from the second image.

Figure 9:
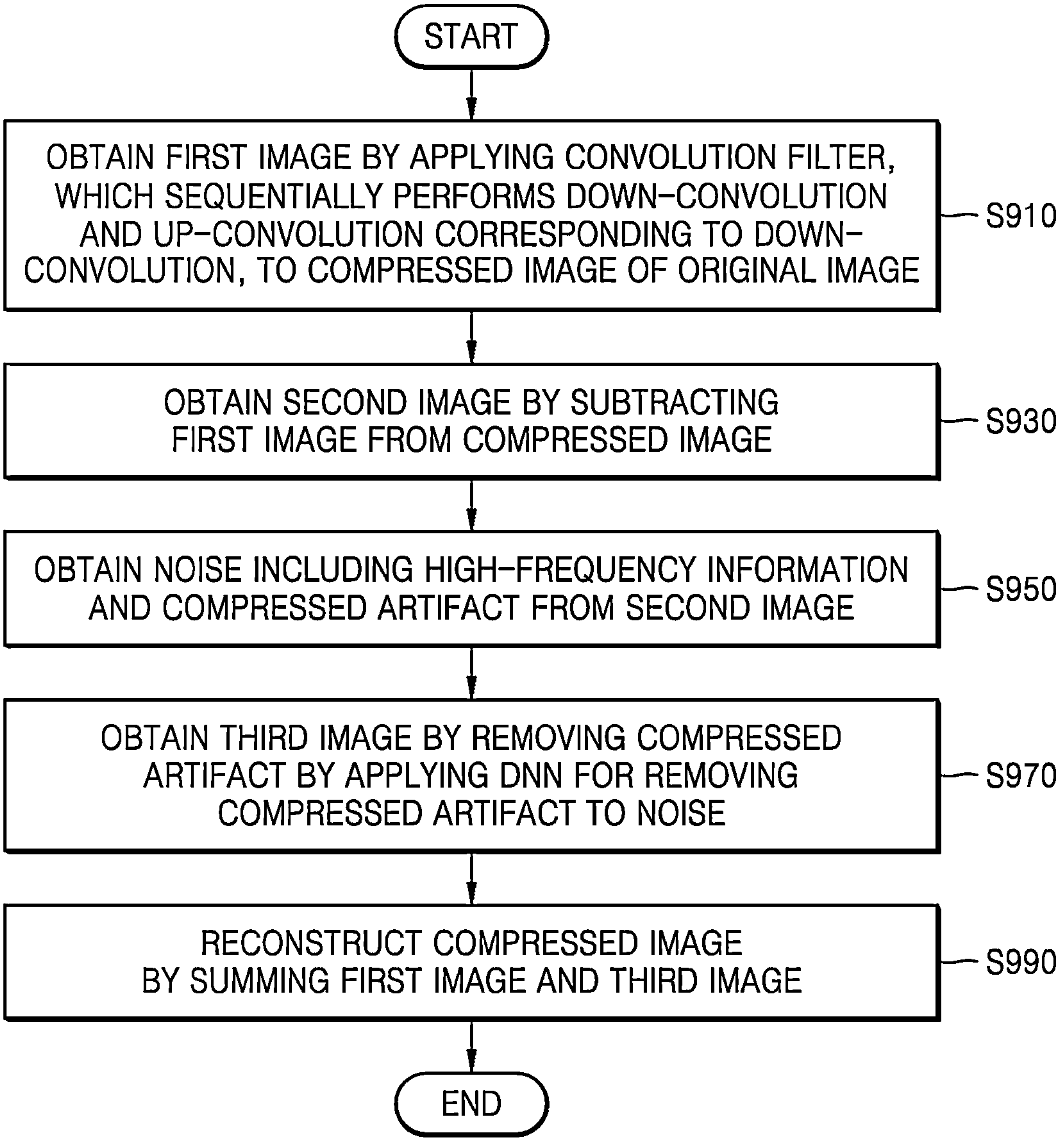
FIG. 9 is a flowchart for describing a method of reducing noise of a compressed image, according to an embodiment.

FIG. 9 is a flowchart for describing a method of reducing noise of a compressed image, according to an embodiment.

In operation S910, the apparatus 500 for reducing noise of a compressed image may obtain a first image by applying a convolution filter, which sequentially performs down-convolution and up-convolution corresponding to the down-convolution, to a compressed image of an original image.

According to an embodiment, the first image may include intermediate-frequency information and low-frequency information of the compressed image.

According to an embodiment, the convolution filter may be trained to obtain the first image including the intermediate-frequency information and the low-frequency information of the compressed image, with the compressed image as an input.

According to an embodiment, the down-convolution may be a convolution operation trained to reduce the size of the compressed image.

According to an embodiment, the up-convolution may be a convolution operation trained to increase the down-convoluted compressed image to the original size of the compressed image.

According to an embodiment, the down-convolution and the up-convolution may be transposed to each other.

In operation S930, the apparatus 500 for reducing the noise of the compressed image may obtain a second image by subtracting the first image from the compressed image.

In operation S950, the apparatus 500 for reducing the noise of the compressed image may obtain noise including high-frequency information and a compressed artifact of the compressed image from the second image.

In operation S970, the apparatus 500 for reducing the noise of the compressed image may remove the compressed artifact by applying a DNN for removing the compressed artifact to the noise, thereby obtaining a third image.

According to an embodiment, the DNN for removing the compressed artifact may be trained to reduce the compressed artifact with high-frequency information and the compressed artifact of the compressed image as an input.

According to an embodiment, the DNN for removing the compressed artifact may include a convolution layer and an activation layer.

According to an embodiment, the DNN for removing the compressed artifact may further include a batch normalization layer.

In operation S990, the apparatus 500 for reducing the noise of the compressed image may reconstruct the compressed image by summing the first image and the third image.

Meanwhile, the above-described embodiments of the disclosure may be written as a program or instruction executable on a computer, and the program or instruction may be stored in a medium.

The medium may continuously store an executable program or instruction or temporarily store the same for execution or downloading. The medium may include various recording means or storage means in a form of single hardware or a combination of several hardware, and may be distributed over a network without being limited to a medium directly connected to a certain computer system. Examples of the medium may include a magnetic medium such as a hard disk, a floppy disk, and a magnetic tape, an optical recording medium such as a CD-ROM and a DVD, a magneto-optical medium such as a floptical disk, ROM, RAM, flash memory, etc., to store a program instruction. Other examples of the medium may include a recording medium or a storage medium managed by an app store that distributes applications, a site that supplies or distributes various software, a server, etc.

Meanwhile, the model associated with the DNN described above may be implemented as a software module. When implemented as a software module (e.g., a program module including an instruction), a DNN model may be stored on a computer-readable readable recording medium.

The DNN model may be integrated in the form of a hardware chip so as to be a part of the apparatus 400 for extracting noise of a compressed image or the apparatus 500 for reducing noise of a compressed image. For example, the DNN model may be made in a dedicated hardware chip form for artificial intelligence, or as a part of a conventional universal processor (e.g., a CPU or AP) or a graphical dedicated processor (e.g., a GPU).

In addition, the DNN model may be provided in the form of downloadable software. The computer program product may include a product (e.g., a downloadable application) in the form of a software program electronically distributed electronically through a manufacturer or an electronic market. For the electronic distribution, at least a part of the software program may be stored in a storage medium or temporarily generated. In this case, the storage medium may be a server of the manufacturer or the electronic market, or a storage medium of a relay server.

While the disclosure has been particularly shown and described with reference to embodiments of the present disclosure, it will be understood by one of ordinary skill in the art that various changes in form and details may be made therein without departing from the scope of the disclosure as defined by the following claims.

The invention claimed is:

1. A method of extracting noise of a compressed image, the method comprising:

obtaining a frequency-band based first image by applying a convolution filter, the convolution filter sequentially performing down-convolution and up-convolution corresponding to the down-convolution, to the compressed image of an original image;

obtaining a second image by subtracting the frequency-band based first image from the compressed image; and obtaining from the second image, a noise, the noise comprising high-frequency information of the compressed image and a compressed artifact of the compressed image, wherein the convolution filter is trained to separate and obtain, from the compressed image, the frequency-band based first image comprising intermediate-frequency information of the compressed image and low-frequency information of the compressed image according to frequency bands, based on loss information determined from a comparison between an output of the convolution filter and an output of frequency band filter, and wherein the convolution filter is further trained by:

reducing input feature map of the compressed image having a large dimension to a small dimension input feature map through the down-convolution using a first trained filter kernel to generate a down-convoluted compressed image, and expanding the small dimension input feature map to the large dimension through the up-convolution using a second trained filter kernel to increase the down-convoluted compressed image to an original size of the compressed image.

2. The method of claim 1, wherein the down-convolution and the up- convolution are transposed to each other.

3. A method of reducing noise of a compressed image, the method comprising:

obtaining a frequency-band based first image by applying a convolution filter, the convolution filter sequentially performing down-convolution and up-convolution corresponding to the down-convolution, to the compressed image of an original image;

obtaining a second image by subtracting the frequency-band based first image from the compressed image;

obtaining from the second image, a noise, the noise comprising high-frequency information of the compressed image and a compressed artifact of the compressed image;

obtaining a third image by removing the compressed artifact by applying a deep neural network (DNN) for removing the compressed artifact, to the noise; and reconstructing the compressed image by summing the frequency-band based first image and the third image, wherein the convolution filter is trained to separate and obtain, from the compressed image, the frequency-band based first image comprising intermediate-frequency information of the compressed image and low-frequency information of the compressed image according to frequency bands, based on loss information determined from a comparison between an output of the convolution filter and an output of frequency band filter, and wherein the convolution filter is further trained by:

reducing input feature map of the compressed image having a large dimension to a small dimension input feature map through the down-convolution using a first trained filter kernel to generate a down-convoluted compressed image, and expanding the small dimension input feature map to the large dimension through the up-convolution using a second trained filter kernel to increase the down-convoluted compressed image to an original size of the compressed image.

4. The method of claim 3, wherein the DNN for removing the compressed artifact is trained to reduce the compressed artifact with the high-frequency information of the compressed image and the compressed artifact of the compressed image as an input.

5. The method of claim 3, wherein the DNN for removing the compressed artifact comprises a convolution layer and an activation layer.

6. The method of claim 5, wherein the DNN for removing the compressed artifact further comprises a batch normalization layer.

7. An apparatus for reducing noise of a compressed image, the apparatus comprising:

a memory storing one or more instructions; and a processor configured to execute the one or more instructions stored in the memory, wherein the processor is further configured to:

obtain a frequency-band based first image by applying a convolution filter, the convolution filter sequentially performing down-convolution and up-convolution corresponding to the down-convolution, to a compressed image of an original image;

obtain a second image by subtracting the frequency-band based first image from the compressed image;

obtain from the second image, a noise, the noise comprising high-frequency information of the compressed image and a compressed artifact of the compressed image;

obtain a third image by removing the compressed artifact by applying a deep neural network (DNN) for removing the compressed artifact to the noise; and reconstruct the compressed image by summing the frequency-band based first image and the third image, wherein the convolution filter is trained to separate and obtain, from the compressed image, the frequency-band based first image comprising intermediate-frequency information of the compressed image and low-frequency information of the compressed image according to frequency bands, based on loss information determined from a comparison between an output of the convolution filter and an output of frequency band filter, and wherein the convolution filter is further trained by:

reducing input feature map of the compressed image having a large dimension to a small dimension input feature map through the down-convolution using a first trained filter kernel to generate a down-convoluted compressed image, and expanding the small dimension input feature map to the large dimension through the up-convolution using a second trained filter kernel to increase the down-convoluted compressed image to an original size of the compressed image.

* * * * *